US012693178B2

(12) United States Patent
    Sorkin

(10) Patent No.:    US 12,693,178 B2
(45) Date of Patent:         Jul. 28, 2026

(54) METHODS AND SYSTEMS FOR MONITORING STRESS IN A TENDON DURING CONCRETE TENSIONING USING A JACK

(71) Applicant: Felix Sorkin, Stafford, TX (US)

(72) Inventor:  Felix Sorkin, Stafford, TX (US)

(73) Assignee: Felix Sorkin, Stafford, TX (US)

( * ) Notice:   Subject to any disclaimer, the term of this patent is extended or adjusted under 35 U.S.C. 154(b) by 0 days.

(21) Appl. No.: 19/013,470

(22) Filed:     Jan. 8, 2025

(65)               Prior Publication Data

US 2025/0224283 A1      Jul. 10, 2025

Related U.S. Application Data

(60) Provisional application No. 63/618,598, filed on Jan. 8, 2024.

(51) Int. Cl.
     *G01L 1/02*          (2006.01)
     *G01L 5/00*          (2006.01)
(52) U.S. Cl.
     CPC . *G01L 1/02* (2013.01); *G01L 5/00* (2013.01)
(58) Field of Classification Search
     CPC .......... G01N 2291/0232; G01N 33/383; E04G
            21/12; G01B 21/02; G01L 19/083; E02D
                                                33/00
     See application file for complete search history.

(56)                References Cited

U.S. PATENT DOCUMENTS 3,090,598 A  *  5/1963  Odilo ................... E04G 21/121
                                                    254/29 A
     3,176,961 A  *  4/1965  Glass ................... E04G 21/121
                                                    254/29 A
     3,666,375 A      5/1972  Priest et al.
     3,701,509 A     10/1972  Stinton
     3,703,030 A  * 11/1972  Simms ................. E04G 21/121
                                                    29/452

(Continued)

FOREIGN PATENT DOCUMENTS

EP          0665379 A1     8/1995
     FR          2811002 A1     1/2002
                    (Continued)

OTHER PUBLICATIONS

International Search Report and Written Opinion dated Feb. 14, 2025 received in related PCT/US2024/058666, 12 pages.
                    (Continued)

*Primary Examiner* — Tran M. Tran
(74) *Attorney, Agent, or Firm* — Ervin Cohen & Jessup LLP

(57)                ABSTRACT
A process for monitoring stress applied to a tendon by a hydraulic jack during tensioning of concrete is described. The process includes measuring an amount of hydraulic fluid that flows through the hydraulic jack during tensioning of the tendon. The measured amount of hydraulic fluid is corelated with an amount of stress applied per unit of hydraulic fluid to determine a total amount of stress employed on the tendon. The process can also include measuring the distance of travel of the hydraulic piston. The measured travel can then be used to calculated the distance the tendon has been pulled (i.e., the elongation), as well as the stress applied to the tendon.

5 Claims, 14 Drawing Sheets

(56)                References Cited

U.S. PATENT DOCUMENTS

| | | | | |
|---|---|---|---|---|
| 3,785,617 | A * | 1/1974 | Friedrich | E21D 20/003 |
| | | | | 29/241 |
| 3,811,653 | A * | 5/1974 | Persicke | E04G 21/121 |
| | | | | 254/29 A |
| 3,902,698 | A * | 9/1975 | Furrer | B25B 27/304 |
| | | | | 254/10.5 |
| 3,954,005 | A * | 5/1976 | Edwards | G01N 3/10 |
| | | | | 73/833 |
| 4,103,540 | A * | 8/1978 | McLaughlin | G01N 3/00 |
| | | | | 73/831 |
| 4,106,752 | A * | 8/1978 | Roqueta | B28B 23/043 |
| | | | | 254/29 A |
| 4,110,643 | A | 8/1978 | Muller | |
| 4,186,169 | A * | 1/1980 | Black | B28B 23/04 |
| | | | | 425/111 |
| 4,198,857 | A * | 4/1980 | Preux | G01L 1/02 |
| | | | | 73/862.041 |
| 4,302,978 | A * | 12/1981 | Dykmans | E04G 21/121 |
| | | | | 73/828 |
| 4,302,979 | A * | 12/1981 | Dykmans | E04G 21/121 |
| | | | | 73/828 |
| 4,614,110 | A * | 9/1986 | Osterberg | E02D 33/00 |
| | | | | 73/84 |
| 4,746,096 | A * | 5/1988 | Donnell | E21B 19/086 |
| | | | | 254/108 |
| 4,805,877 | A * | 2/1989 | Hoekstra | G01L 5/06 |
| | | | | 15/257.06 |
| 4,862,576 | A * | 9/1989 | Lu | E04G 21/121 |
| | | | | 254/29 A |
| 5,282,701 | A * | 2/1994 | An | E02D 5/00 |
| | | | | 405/253 |
| 5,342,568 | A * | 8/1994 | Yokota | E04C 5/08 |
| | | | | 52/223.6 |
| 5,452,629 | A * | 9/1995 | Heiermann | G01B 7/02 |
| | | | | 81/57.38 |
| 5,576,494 | A * | 11/1996 | Osterberg | E02D 1/022 |
| | | | | 73/803 |
| 6,070,314 | A * | 6/2000 | Pithon | B21D 39/04 |
| | | | | 29/282 |
| 6,224,036 | B1 * | 5/2001 | Prince | E04G 21/121 |
| | | | | 29/452 |
| 6,290,473 | B1 | 9/2001 | Thome et al. | |
| 6,311,567 | B1 * | 11/2001 | England | G01L 5/0038 |
| | | | | 73/806 |
| 6,318,038 | B1 * | 11/2001 | Park | E04G 21/121 |
| | | | | 52/223.13 |
| 6,328,541 | B1 | 12/2001 | Veronesi | |
| 6,470,636 | B1 * | 10/2002 | Rose | E04G 21/12 |
| | | | | 52/223.13 |
| 6,647,801 | B1 * | 11/2003 | Deuar | G01M 5/0058 |
| | | | | 73/806 |
| 6,739,129 | B2 | 5/2004 | Heusser | |
| 6,848,323 | B2 * | 2/2005 | Krouth | F15B 15/2838 |
| | | | | 73/861.47 |
| 6,880,412 | B1 | 4/2005 | Gupta | |
| 7,147,210 | B2 * | 12/2006 | Foege | E04G 21/121 |
| | | | | 254/93 H |
| 7,353,714 | B2 * | 4/2008 | England | E02D 33/00 |
| | | | | 73/784 |
| 8,152,458 | B2 | 4/2012 | Buell | |
| 8,702,066 | B2 | 4/2014 | Steidinger et al. | |
| 9,103,131 | B2 * | 8/2015 | Domage | E04G 21/12 |
| 9,134,190 | B2 * | 9/2015 | Hayes | G01L 5/0038 |
| 9,506,492 | B2 * | 11/2016 | Trautman | F16B 31/043 |
| 10,203,268 | B2 * | 2/2019 | Parker | G01B 11/14 |
| 10,281,270 | B2 * | 5/2019 | Smith | E21B 19/04 |
| 10,364,816 | B2 | 7/2019 | Nofal et al. | |
| 10,400,801 | B2 | 9/2019 | Boehler | |
| 10,830,655 | B2 * | 11/2020 | Cook | E04G 21/121 |
| 10,844,619 | B2 * | 11/2020 | Kang | G01L 19/086 |
| 11,162,482 | B2 | 11/2021 | Dawson et al. | |
| 2003/0106381 | A1 | 6/2003 | Krouth et al. | |
| 2005/0177992 | A1 | 8/2005 | Foege | |
| 2007/0271762 | A1 * | 11/2007 | Hohensee | E04G 21/121 |
| | | | | 29/452 |
| 2013/0333487 | A1 | 12/2013 | Hayes | |
| 2014/0016114 | A1 * | 1/2014 | Lopez | G01S 17/42 |
| | | | | 356/138 |
| 2016/0333902 | A1 * | 11/2016 | Hodel | F15B 15/2876 |
| 2017/0217026 | A1 * | 8/2017 | Sipe | B25J 15/0023 |
| 2017/0356438 | A1 | 12/2017 | Hughes | |
| 2018/0106041 | A1 * | 4/2018 | Sorkin | E04C 5/012 |
| 2018/0335024 | A1 | 11/2018 | Hughes | |
| 2018/0371769 | A1 | 12/2018 | Kang et al. | |
| 2020/0173430 | A1 | 6/2020 | Hughes et al. | |
| 2021/0277912 | A1 | 9/2021 | Sinico et al. | |
| 2023/0055442 | A1 | 2/2023 | Dyer et al. | |

FOREIGN PATENT DOCUMENTS

| | | |
|---|---|---|
| GB | 998313 A | 7/1965 |
| JP | 3165419 B1 | 5/2001 |
| WO | 2008118686 A1 | 10/2008 |

OTHER PUBLICATIONS

International Search Report and Written Opinion dated Feb. 27, 2025 received in PCT/US2024/058949, 9 pages.

Stressing Tendons with Short Tendon Tails, from https://www.amsyscoinc.com/2013/06/13/ stressing-tendons-with-short-tendon-tails/ ; archived Jul. 27, 2013 (Year: 2013).

Translation of FR 2811002 A1 (Year: 2002).

International Search Report and Written Opinion dated May 1, 2025 received in related PCT/US2025/010699, 14 pages.

SPX—Hydraulic Post-Tensioning Jacks, from "http://www.spxflow.com/en/assets/pdf/102920_0plnst.pdf" archived on Aug . 7, 2016, archived URL: "https://web.archive.org/web/20160807001428/http://www.spxflow.com/en/assets/pdf/102920_0plnst.pdf"(Year: 2016).

* cited by examiner

200

200

232

300

314

300

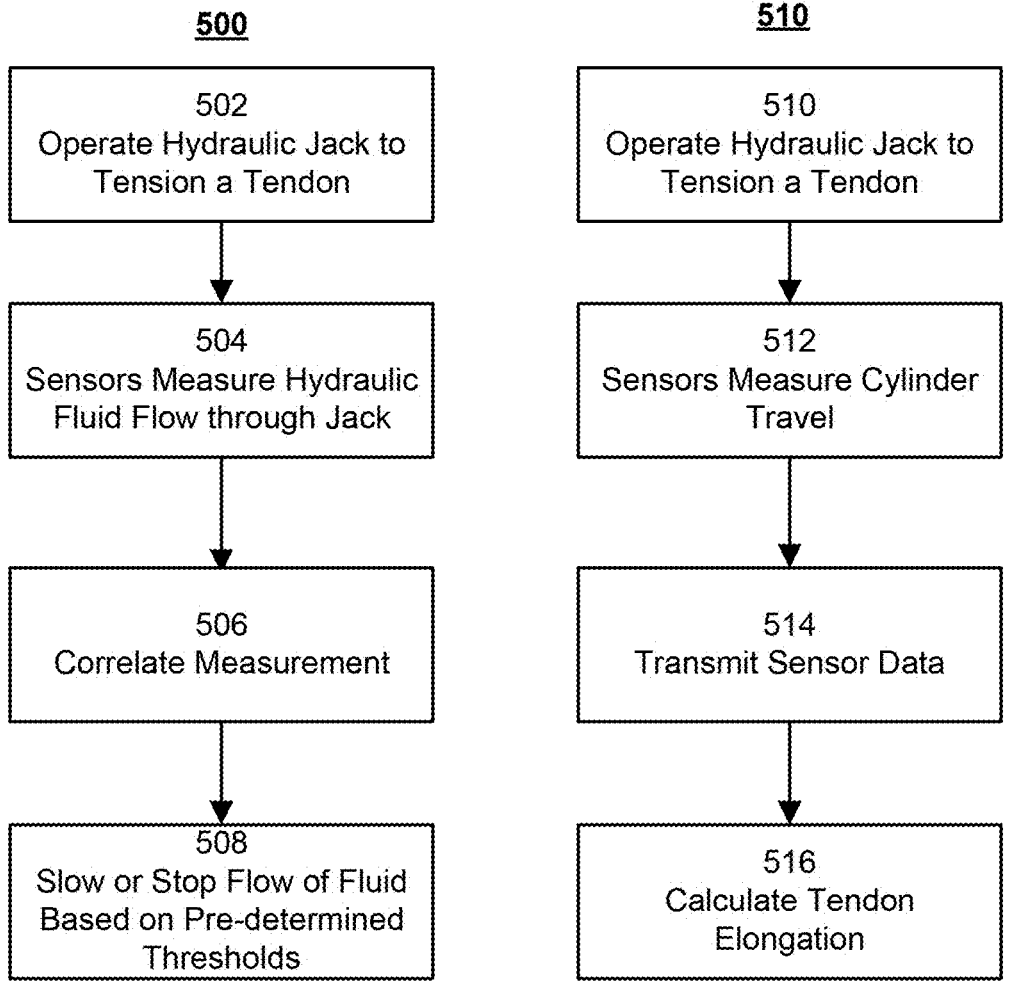
FIG. 15a                    FIG. 15b

METHODS AND SYSTEMS FOR MONITORING STRESS IN A TENDON DURING CONCRETE TENSIONING USING A JACK

CROSS-REFERENCE TO RELATED APPLICATIONS

This application claims priority to U.S. Provisional Patent Application No. 63/618,598, entitled "Methods and Systems for Monitoring Stress," filed on Jan. 8, 2024. The entire disclosure of this priority application is incorporated herein by reference in its entirety.

This application is also related to U.S. application Ser. No. 18/501,311, filed on Nov. 3, 2023, Ser. No. 18/970,700, filed Dec. 5, 2024, and Ser. No. 18/972,261, filed on Dec. 6, 2024, the entire disclosures of which are incorporated herein by reference in their entirety.

FIELD OF THE DISCLOSURE

The present disclosure relates to systems and methods for monitoring stress during concrete tensioning.

BACKGROUND INFORMATION

Pre-stressed concrete is structural concrete in which internal stresses are introduced to reduce potential tensile stresses in the concrete resulting from applied loads. Pre-stressing may be accomplished by post-tensioned pre-stressing or pre-tensioned prestressing. In post-tensioned pre-stressing, a tension member is tensioned after the concrete has attained a desired strength by use of a post-tensioning tendon. The post-tensioning tendon may include for example and without limitation, anchor assemblies, the tension member, and sheathes.

Traditionally, a tension member is constructed of a material that can be elongated and may be a single or a multi-strand cable. The tension member may be formed from a metal, such as reinforced steel. The post-tensioning tendon traditionally includes an anchor assembly at each end. The tension member is fixedly coupled to a fixed anchor assembly positioned at one end of the post-tensioning tendon, the "fixed end," and stressed at the stressed anchor assembly positioned at the opposite end of the post-tensioning tendon, the "stressing end" of the post-tensioning tendon. Single acting post-tensioning jack (PTJ) models with spring seating or power seating have proven ideal for slab-on-grade and other applications. Double acting (DA) PTJ models can have an 8.5" stroke and can be machined from steel billets. These jacks can feature standard power seating and have gun-drilled hydraulic fluid passages. Nose lengths vary and a full line of gripper sizes are usually available to stress most common strand sizes.

However, typical existing PTJs can be heavy, which can make use awkward in certain situations. Moreover, existing jacks present a pinch hazard when they return from a working position to a resting position. Thus, it may be beneficial to provide a lightweight post-tensioning jack that also maintains a gap in a resting position to avoid potential pinch hazards.

Finally, when using conventional PTJs, the amount of stress employed on a strand or tendon (single or multistrand) is typically estimated by measuring the distance the strand or tendon has been pulled. This indirect estimate is subject to human measurement error as well as other potential calculation errors. What's more, often the strand or tendon is left exposed to the elements while waiting for a building inspector or supervisor to check whether a strand or tendon has been pulled to a sufficient measured length. Thus, what is needed are improved systems and methods for measuring, monitoring, controlling, and/or reporting applied stress in concrete tensioning. These and other deficiencies exist.

SUMMARY

Exemplary embodiments include a process for monitoring stress applied to a tendon by a hydraulic jack during tensioning of concrete, the process including measuring an amount of hydraulic fluid that flows through the hydraulic jack during tensioning and correlating the measured amount of hydraulic fluid with an amount of stress applied per unit of hydraulic fluid to determine a total amount of stress employed on the tendon.

Exemplary embodiments also include a process for monitoring stress applied to a tendon by a hydraulic jack during tensioning of concrete, including measuring a distance of travel of a rod on a the hydraulic jack during tensioning and calculating a total amount of stress employed on the tendon from the measuring distance.

BRIEF DESCRIPTION OF THE DRAWINGS

Various embodiments of the present disclosure, together with further objects and advantages, may best be understood by reference to the following description taken in conjunction with the accompanying drawings.

FIGS. 15a and 15b depict methods for measuring stress according to exemplary embodiments.

Figure 1:
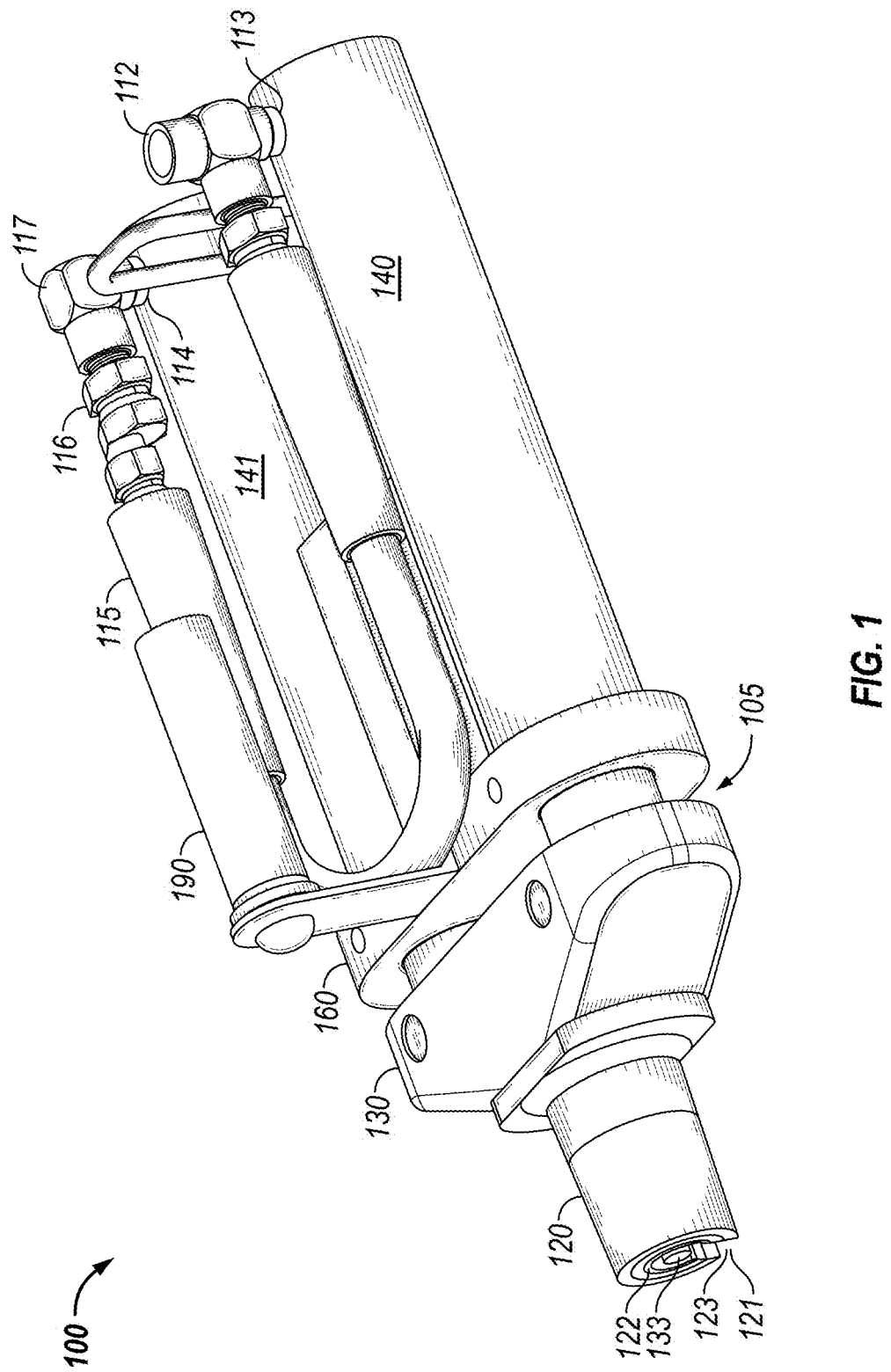
FIG. 1 depicts views of a lightweight post-tensioning jack according to exemplary embodiments.

These and other objects, features and advantages of the exemplary embodiments of the present disclosure will become apparent upon reading the following detailed description of the exemplary embodiments of the present disclosure, when taken in conjunction with the appended paragraphs.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Exemplary embodiments of the invention will now be described in order to illustrate various features of the invention. The embodiments described herein are not intended to be limiting as to the scope of the invention, but rather are intended to provide examples of the components, use, and operation of the invention.

The techniques described herein may relate to a frameless lightweight jack including: a pressure cylinder, the pressure cylinder having a pressure cylinder passage; a pressure cylinder body, the pressure cylinder body being a block through which a pressure cylinder body passage is formed, the pressure cylinder body mechanically coupled to the pressure cylinder; a first and a second hydraulic actuator, the first and the second hydraulic actuator each coupled to the pressure cylinder body on a proximal end, wherein the first and the second hydraulic actuator are in hydraulic communication through a cylinder loop hose connected to a port in a distal end of each of the first and second hydraulic actuator; an extending body, the extending body coupled to the first and the second hydraulic actuator, the extending body being a block through which an extending body passage is formed, wherein the pressure cylinder passage, the pressure cylinder body passage, and the extending body passage are aligned to form a tension member channel; and a strand grabber assembly, the strand grabber assembly mechanically coupled to the extending body; wherein the pressure cylinder, pressure cylinder body, and extending body are included of aluminum, titanium, fiber reinforced plastic, polymers, or carbon fiber.

The techniques described herein may also relate to a frameless lightweight jack, wherein the hydraulic actuators are pneumatically actuated. The techniques described herein relate to a frameless lightweight jack, wherein the first and the second hydraulic actuator each have an internal piston. The techniques described herein relate to a frameless lightweight jack, wherein the first and the second hydraulic actuator are each coupled to the pressure cylinder body at a proximal end of the internal piston of each hydraulic actuator.

The techniques described herein may also relate to a frameless lightweight jack, wherein the strand grabber assembly includes: a strand grabber handle; a strand grabber; a grabber block; and a grabber retaining plate. The techniques described herein relate to a frameless lightweight jack, wherein the first and the second hydraulic actuator are free floating on the distal ends.

The techniques described herein may also relate to a frameless lightweight jack, wherein the port in the distal end of each of the first and second hydraulic actuator is on a circumferential surface of each hydraulic actuator.

The techniques described herein may also relate to a frameless lightweight jack including: a pressure cylinder body, the pressure cylinder body being a block through which a pressure cylinder body passage is formed; a first and a second hydraulic actuator, the first and the second hydraulic actuator each coupled to the pressure cylinder body on a proximal end, wherein the first and the second hydraulic actuator are in hydraulic communication through a cylinder loop hose connected to a port in a distal end of each of the first and second hydraulic actuator; an extending body, the extending body coupled to the first and the second hydraulic actuator, the extending body being a block through which an extending body passage is formed, wherein the pressure cylinder body passage and the extending body passage are aligned to form a tension member channel; and a strand grabber assembly, the strand grabber assembly mechanically coupled to the extending body; wherein the pressure cylinder body is configured to not touch the extending body when the frameless lightweight jack is in a retracted position.

The techniques described herein may also relate to a frameless lightweight jack, wherein there is a gap between the pressure cylinder body and the extending body when the frameless lightweight jack is in the retracted position. The gap can be at least 1 inch.

The techniques described herein may also relate to a method of using a frameless lightweight jack including: positioning the frameless lightweight jack in a retracted position so as to abut a concrete structure with a tensioning member, the lightweight jack including: a pressure cylinder body, the pressure cylinder body being a block through which a pressure cylinder body passage is formed; a first and a second hydraulic actuator, the first and the second hydraulic actuator each coupled to the pressure cylinder body on a proximal end, wherein the first and the second hydraulic actuator are in hydraulic communication through a cylinder loop hose connected to a port in a distal end of each of the first and second hydraulic actuator; an extending body, the extending body coupled to the first and the second hydraulic actuator, the extending body being a block through which an extending body passage is formed, wherein the pressure cylinder body passage and the extending body passage are aligned to form a tension member channel; and a strand grabber assembly, the strand grabber assembly mechanically coupled to the extending body; wherein the pressure cylinder body is configured to not touch the extending body when the frameless lightweight jack is in a retracted position; engaging the tensioning member with the strand grabber assembly; moving the frameless lightweight jack from a retracted position to an extended position so as to tension the tension member; moving the frameless lightweight jack from the extended position to the retracted position, such movement resulting in a gap between the pressure cylinder body and the extending body.

Exemplary embodiments are directed to a frameless lightweight jack for stressing a tension member. The frameless lightweight jack may be hydraulically powered, such as through hydraulic fluid delivered by a hydraulic pump having a hydraulic fluid source. A pressure gauge may be included to measure when a tendon has been sufficiently tensioned. In other exemplary embodiments, the frameless lightweight jack may be battery powered, thereby eliminating the need for hydraulic lines and a pump system.

Exemplary embodiments pertain to a process for monitoring stress applied to a tendon by a hydraulic jack during tensioning of concrete. The process comprises measuring an amount of hydraulic fluid that flows through the hydraulic jack during tensioning. The measurement may be done by one or more sensors located on a hydraulic pump. Sensors may also be located on the hydraulic jack and configured to transmit measurement to a receiver. The receiver may be located on the hydraulic pump. Then, the measured amount of hydraulic fluid is correlated with an amount of stress applied per unit of hydraulic fluid to determine a total amount of stress employed on the tendon. The correlation may be done by a processor on the hydraulic pump.

Exemplary embodiments pertain to a process for monitoring stress applied to a tendon by a hydraulic jack during tensioning of concrete. The process comprises measuring an amount of travel of one or more piston cylinders on the hydraulic jack during tensioning. The measurement may be conducted through one or more sensors on the hydraulic jack and transmitted to a receiver. The receiver may be located on a hydraulic pump. The measurement is then used to determine a total amount of stress employed on the tendon.

In exemplary embodiments, the hydraulic pump can include wireless connectivity with the sensors on the hydraulic jack. The hydraulic pump may have one or more processors and associated memory as well as a display.

Various types of sensors can be used on the hydraulic pump and hydraulic jack to measure the various parameters.

Further, although exemplary embodiments pertain to calculation of stress, other calculations can be performed as desired and/or required to support concrete tensioning.

In exemplary embodiments, the frameless lightweight jack may provide over 9000 psi of tension on a tendon as compared with around 5000 psi on conventional designs. In some embodiments, the frameless lightweight jack may include a digital display that provides a real-time pressure reading as a tendon is tensioned. In various embodiments, the jack may contain one or more sensors that provide output to a receiving unit. The receiving unit may be the hydraulic pump. The pump may have a receiver for the output and a display (such as a digital display) that allows for viewing the output from the jack as well as other operator actions.

FIGS. 1 through 5 depict a frameless lightweight jack 100 according to exemplary embodiments. The lightweight jack 100 is depicted in a (fully) retracted or resting position. In certain embodiments, frameless lightweight jack 100 may have a retracted/resting position and an extended/working position. A hydraulic pump (not shown) may be fluidly connected to lightweight jack 100 through one or more hydraulic hoses. The hydraulic pump may be one such as that described herein. Lightweight jack 100 may have a single hydraulic fluid connection point at servicing tee 112. In certain embodiments, light weight jack 100 may include pressure cylinder 120. Pressure cylinder 120 may be frustoconical. In some embodiments, pressure cylinder 120 may be hollow and with a section removed for installing and removing a tensioning tendon, forming cylinder aperture 121. When in use, pressure cylinder 120 may interface with an anchor that houses a tendon wedge. In some embodiments, pressure cylinder 120 may include a tongue on the surface that interfaces with the anchor. In these embodiments, the anchor has a groove designed to receive the tongue of pressure cylinder 120. The tongue and groove design may result in easy alignment of lightweight jack 100 with the anchor, and therefore also the tensioning tendon.

Wedge setter 122 may be positioned within pressure cylinder 120 and secured by pressure cylinder 120 and pressure cylinder body 130. In some embodiments, wedge setter 122 may be conical with a section removed, forming wedge setter aperture 123, again for ease of installing and removing a tensioning tendon into frameless lightweight jack 100. Wedge setter 122 may be hollow for receiving a tensioning tendon. Pressure cylinder 120 and wedge setter 122 may be adapted to receive a portion of a tension member through pressure cylinder passage 133.

Pressure cylinder 120 may be mechanically coupled to pressure cylinder body 130 such that pressure cylinder passage 133 and cylinder body passage 132 align. "Mechanically coupled" for purposes of this disclosure, may include, but not be limited to, threaded couplings, press fitting, mechanical welding, chemical welding, friction welding, thermal coupling or welding, electrical welding, optical welding, beam-energy welding, etc. Pressure cylinder body 130 may be of any shape and may be a block through which cylinder body passage 132 traverses. When frameless lightweight jack 100 is in the (fully) retracted/resting position, pressure cylinder body 130 may not abut or touch extending body 160. In the retracted/resting position, frameless lightweight jack 100 is configured to maintain a gap 105 between pressure cylinder body 130 and extending body 160 sufficient to avoid potential pinching, cutting, etc. of fingers, skin, or any part of the body. For example, in some embodiments, gap 105 may be an inch or more. Pressure cylinder body 130 may be mechanically coupled to hydraulic actuators 140 and 141.

Extending body 160 may be coupled to hydraulic actuators 140 and 141. Extending body 160 may be a block of any shape having extending body passage 136 and adapted to receive hydraulic actuators 140 and 141. Hydraulic actuators 140 and 141 may include internal pistons positioned within and collinear with outer cylinders of hydraulic actuators 140 and 141. These pistons may be configured to extend externally in an axial direction upon hydraulic actuation. Operation of hydraulic actuators 140 and 141 is fully described in U.S. Ser. No. 15/596,261. The pistons may be the portion of hydraulic actuators 140 and 141 that are mechanically coupled to pressure cylinder body 130. These pistons may have a smaller diameter as compared to conventional jack designs. For example, in some embodiments, the pistons may have a diameter of 1.12 in or less. The smaller piston diameter may result in a weight reduction as compared with conventional jack designs.

Upon hydraulic activation, the pistons may extend externally thereby causing axial movement of the pressure cylinder body 130 away from extending body 160 (or in the case that pressure cylinder body 130 is fixed, the extending body 160 may more axially away from fixed pressure cylinder body 130).

Hydraulic actuators 140 and 141 may be free floating on the opposite ends distal from where the pistons extend externally and attach to pressure cylinder body 130, as opposed to being attached to a jack frame, as is the case with existing designs. In existing designs, the frame also includes hydraulic fluid port(s) and internal channels for routing hydraulic fluid. The conventional frame design is metal and comprises a substantial portion of the overall weight of the jack. Embodiments of the present disclosure eliminate the frame for substantial weight savings and incorporate a different hydraulic fluid system.

Figure 4:
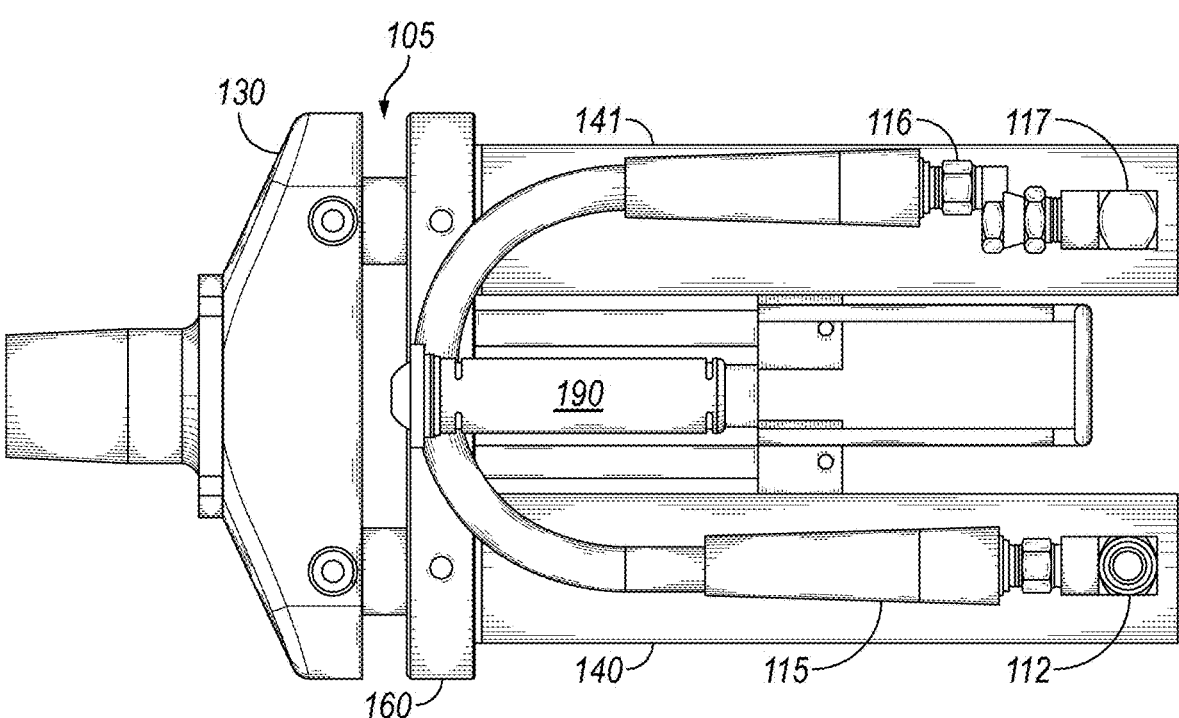
FIG. 4 depicts a top view of a lightweight post-tensioning jack according to exemplary embodiments.
Figure 5:
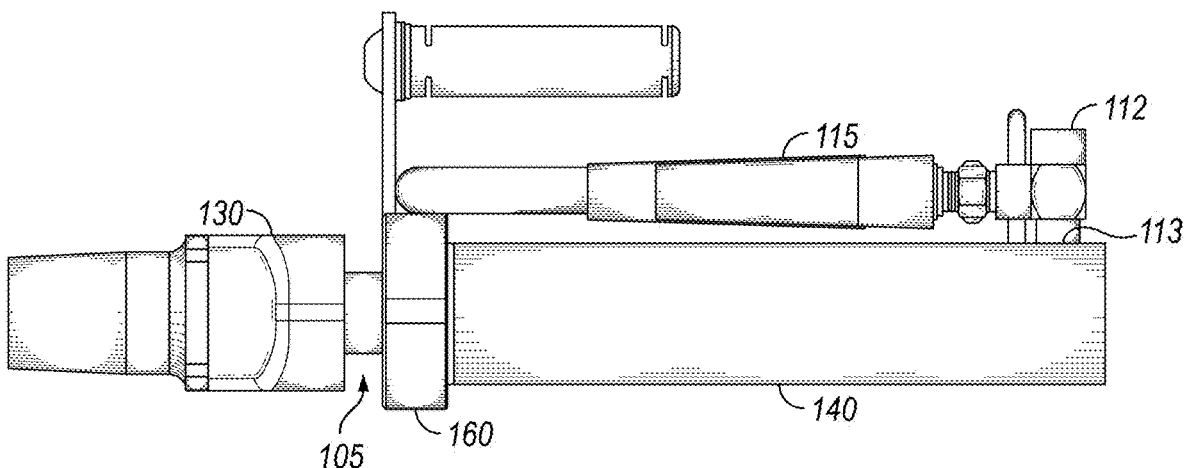
FIG. 5 depicts a side view of a lightweight post-tensioning jack according to exemplary embodiments.

According to exemplary embodiments, and as described above, lightweight jack 100 may have a single hydraulic fluid connection point at servicing tee 112. Servicing tee 112 may install directly in a hydraulic port 113 of hydraulic actuator 140. This port may be near the distal end, opposite extending body 160, and on the circumferential surface of, hydraulic actuator 140. A cylinder loop hose 115 may also attach to servicing tee 112. Cylinder loop hose 115 may run from the servicing tee 112 to a series of fittings, namely swivel fitting 116 and street elbow 117, that install in a hydraulic port 114 of hydraulic actuator 141. This port may be near the distal end, and on the circumferential surface of, hydraulic actuator 141. Thus, the cylinder loop hose 115 may serve to fluidly connect hydraulic actuators 140 and 141 and to maintain equal pressure between these two actuators. Cylinder loop hose 115 may be routed as illustrated in FIGS. 1, 4, and 5, so as to be compact to hydraulic actuators 140 and 141 and to be shielded by jack handle 190. As a result, Cylinder loop hose 115 of frameless lightweight jack 100 may be protected against getting caught on, or snagged by, anything external such as hands, feet, tension member, etc.

Figure 2:
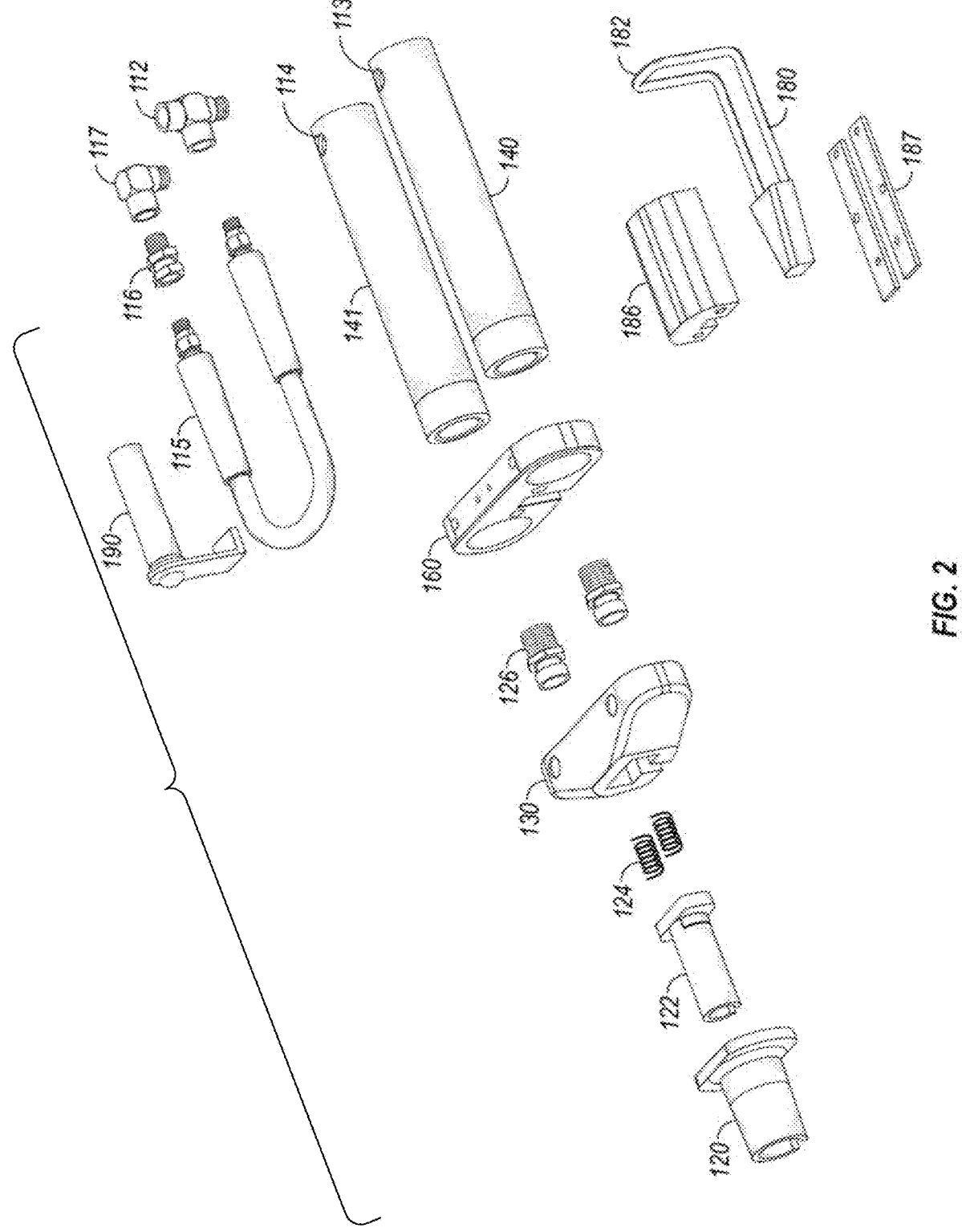
FIG. 2 is an exemplary exploded view of a lightweight post-tensioning jack according to exemplary embodiments.

FIG. 2 shows an exploded view of frameless lightweight jack 100. Pressure cylinder 120 connects with pressure cylinder body 130 and incorporates wedge setter 122. This assembly may also include return springs 124. Hydraulic actuators 140 and 141 may be attached to pressure cylinder body 130 with cylinder studs 126. Hydraulic actuators 140 and 141 may also be connected to extending body 160. Location and routing of the hydraulic system is also evident in FIG. 2. For example, servicing tee 112, cylinder loop hose 115, swivel fitting 116 and street elbow 117 are depicted in their relative orientations. Further, jack handle 190 may attach to extending body 160 and provide a way for users to position and move frameless lightweight jack 100.

Lightweight jack 100 may include strand grabber 180. In some embodiments strand grabber 180 may include one or more strand grabber handles 182. Strand grabber 180 be part of a strand grabber assembly including a grabber block 186 and a grabber retaining plate 187. Strand grabber 180 may be positioned inside grabber block 186 and may be fixed in this position by grabber retaining plate 187 that is mechanically attached to the grabber block 186. Grabber block 186 may be mechanically attached to extending body 160. In some embodiments, strand grabber 180 may engage the tension member at grabber block 186. Grabber block 186 may have an inner surface for receiving the tension member. In some embodiments, the inner surface of grabber block 186 may be curved. In some embodiments, grabber block 186 may circumferentially enclose the tension member. In some embodiments, grabber block 186 may partially extend around a circumference of the tension.

Strand grabber 180 may be adapted to engage with a tension member. Strand grabber 180 may engage with a tension member by such non-limiting means as scissoring, springing, or pliering together, thereby holding the tension member in place. Strand grabber 180 may be allowed movement in the axial direction relative to grabber block 186 for the purpose of "grabbing" a tensioning tendon. For example, when a tensioning tendon is installed, the handle of strand grabber 180 may be pulled axially away from the direction of the tensioning tendon. This causes a wedge effect where the tensioning tendon is grabbed and not allowed to move. Upon activation of frameless lightweight jack 100, hydraulic actuators 140 and 141 cause relative axial movement between pressure cylinder 120 and extending body 160. With a tensioning tendon installed, that force tending to cause the relative axial movement may be transmitted to the tensioning tendon via strand grabber 180 and grabber block 186, which hold the tensioning tendon, thereby preventing slipping. The result may be a tensioning force applied to the tensioning tendon by frameless lightweight jack 100.

Figure 3:
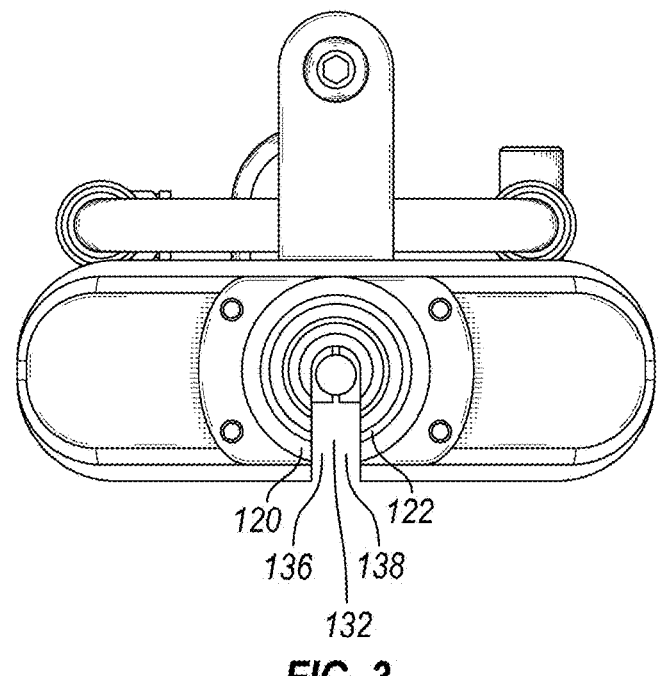
FIG. 3 depicts a front view of a lightweight post-tensioning jack according to exemplary embodiments.

FIG. 3 shows a front view of frameless lightweight jack 100. As shown in FIG. 3, cylinder body passage 132 and extending body passage 136 are aligned to form tension member channel 138 adapted to receive a tension member.

FIG. 4 shows a top-level view of frameless lightweight jack 100. This view further illustrates position of the hydraulic system of frameless lightweight jack 100 and the relative locations of servicing tee 112, cylinder loop hose 115, swivel fitting 116 and street elbow 117. For example, cylinder loop hose 115 may connect to servicing tee 112, run axially along the outer diameter of hydraulic actuator 140, turn toward hydraulic actuator 141, run under jack handle 190, and axially back down the outer diameter of hydraulic actuator 141 before connecting to swivel fitting 116 and street elbow 117. Further, gap 105 between pressure cylinder 130 and extending body 160 is maintained when frameless lightweight jack 100 is in a retracted/resting position. In exemplary embodiments, gap 105 may be maintained with hydraulic actuators 140 and 141. For example, the internal pistons of hydraulic actuators 140 and 141 may be sized such that they are longer than the external casing or shell of hydraulic actuators 140 and 141. Thus, in the retracted/resting position, the pistons may extend from hydraulic actuators 140 and 141 to maintain a gap 105. In other exemplary embodiments, hydraulic actuators 140 and 141 may include one or more internal stops that limit travel of the internal pistons such that in the retracted/resting position, the pistons of hydraulic actuators 140 and 141 may maintain a gap 105.

FIG. 5 shows a side view of frameless lightweight jack 100. Routing of the hydraulic system and relative positioning according to an exemplary embodiment may evident. Hydraulic actuators 140 and 141 may be free floating, without frame, on a distal end opposite extending body 160. Further, gap 105 between pressure cylinder 130 and extending body 160 is maintained when frameless lightweight jack 100 is in a retracted/resting position.

During operation, frameless lightweight jack 100 may be positioned against a portion of concrete from which a tensioning member extends. This portion of concrete may be a pocket formed within the concrete for the purpose of housing a tensioning member. Pressure cylinder 120 may be inserted against the concrete, or into the concrete pocket so as to position the tension member within tension member channel 138. Wedge setter 122 may abut one or more wedges disposed within the concrete pocked and surrounding the tensioning member. As hydraulic pressure is applied by frameless lightweight jack 100 as described below, pressure cylinder 120 and wedge setter 122 may push the one or more wedges thereby holding the tension member in place. In applying hydraulic pressure via frameless lightweight jack 100, hydraulic pressure may be applied to pressure cylinder 120 through hydraulic actuators 140 and 141 to move frameless lightweight jack 100 from a retracted position to an extended position.

As discussed, hydraulic actuation may cause the inner pistons of hydraulic actuators 140 and 141 extend, thereby causing extending body 160 to move axially away from the concrete and tensioning member. As extending body 160 moves axially away from the concrete, strand grabber 180 may pull the tensioning member away from the concrete, thereby tensioning the tension member. Hydraulic pressure may be added until a preferred hydraulic pressure is reached. Hydraulic fluid may be extracted from frameless lightweight jack 100 via one or more hoses connected to servicing tee 112.

FIGS. 6A, 6B, 7, 8, and 9 depict a second lightweight frameless jack 200 according to exemplary embodiments. The jack 200 may be a dual action jack and is depicted in a (fully) retracted or resting position according to exemplary embodiments; the jack 200 has a second extended or working position. The jack 200 may be used for the same or similar purposes to the lightweight jack 100 described above. The jack 200 is hydraulically operated. The jack 200 has a two-piece chuck configuration for gripping a tendon.

Exemplary embodiments of the dual action lightweight jack may include a removable/replaceable nose piece, which may be referred to as a pressure cylinder 220. The pressure cylinder 220 is mounted to a mounting assembly 130 which is attached to two pistons or cylinder rod assemblies 228, which are moveably (slidably) mounted into the frame 203 of the dual action lightweight jack 200. The pistons 228 are hydraulically operated.

Figure 8:
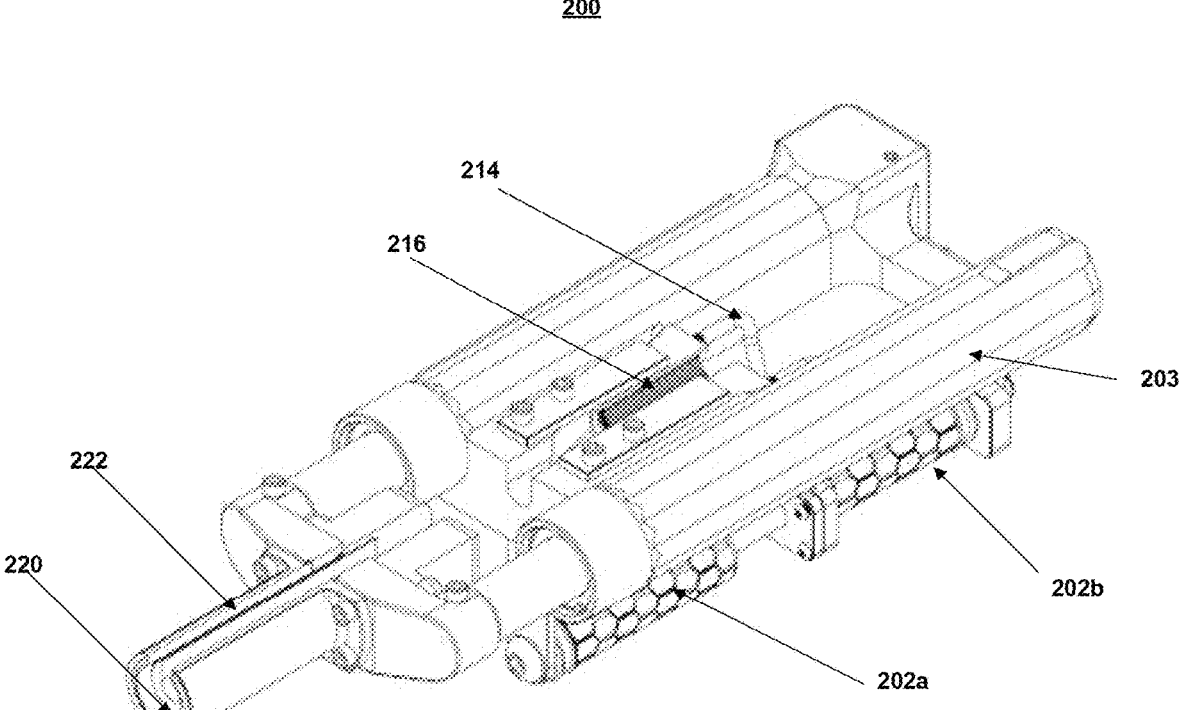
FIG. 8 depicts a bottom perspective view of the second lightweight post-tensioning jack according to exemplary embodiments.
Figure 9:
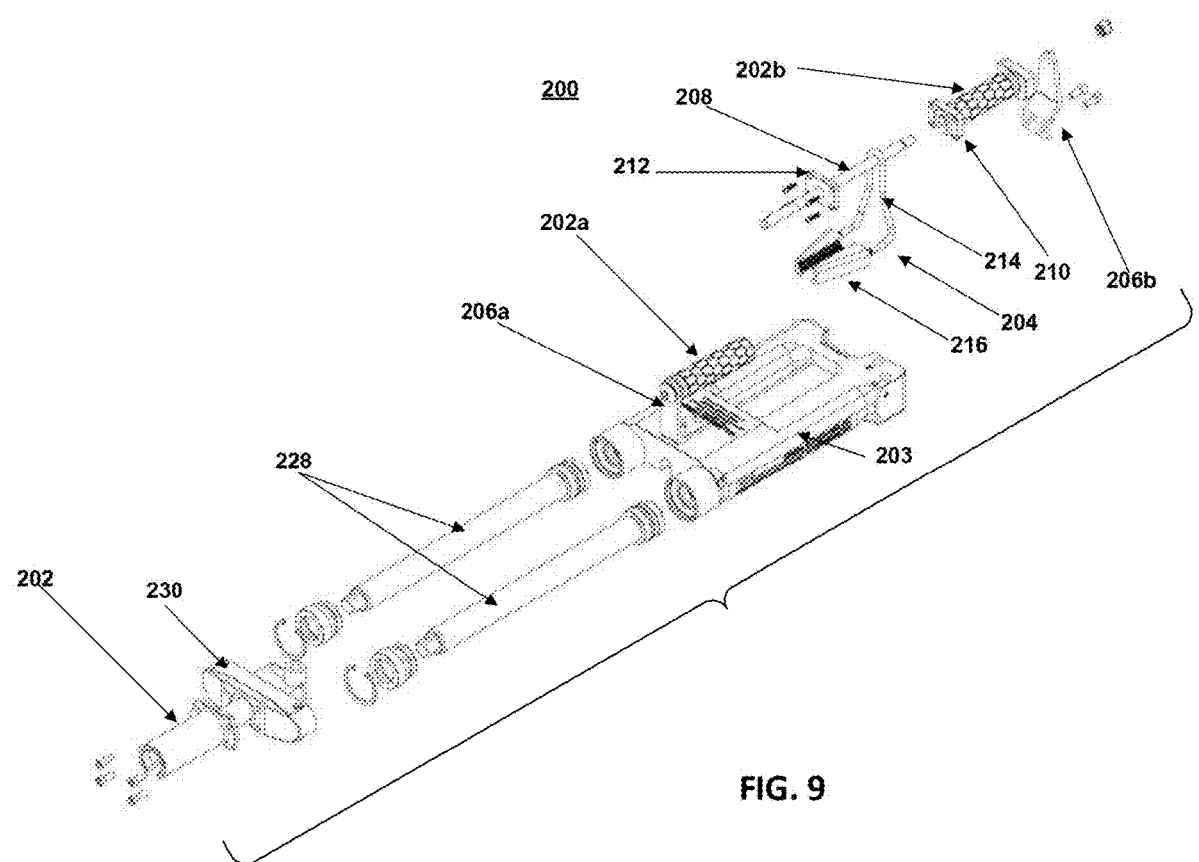
FIG. 9 depicts an exploded view of the second lightweight post-tensioning jack according to exemplary embodiments.

The pressure cylinder 220 may serve as a bearing surface during tensioning operation, and as such, may wear over time. Exemplary embodiments can allow for replacement of this wear part in order to extend the useful life of exemplary dual action lightweight jacks according to the present disclosure. The removable nose piece may also be modular and may allow for use with different size tensioning strands. Exemplary embodiments may include a nose piece with a tongue and groove design. As can be seen in FIG. 8, for example, the pressure cylinder 220 may have a cut-out 222 to accept a tendon. The jack 200 has a gap between the pressure cylinder body and the extending body when the jack is in the retracted position. The gap can be at least 1 inch. The gap 226 between the pressure cylinder 220 and the frame 203 can be seen, for example, in FIG. 6A.

The jack 200 as shown in may include a dual handle assembly, consisting of front handle (or fixed handle) 202a and rear handle (or slidable handle) 202b, with a chuck assembly 204 attached to one slidable portion of the dual handle. The front handle 202a may also be referred to as the fixed handle. The rear handle 202b may also be referred to as the slidable handle.

The handle assembly attaches to a front and rear portion of the jack frame 203. The dual handle assembly is attached with brackets 206a and 206b. In other embodiments, other attachment mechanisms or hardware may be used. The front handle 202a is attached to or mounted to the front bracket 206a. That is, it is fixed. The front handle 202a may be secured to the front bracket with a nut or rivet or other suitable fastener. This may be a removable fastener. The rear handle 202b is not attached to the rear bracket 206b so that is can slidably move. A rod 208 extends between the two brackets. The rod 208 may be made of metal; in various other embodiments, other materials such as plastic may be used. The rod 208 may be fixed between the two brackets 206a/b, or can be capable of rotating axially along the length of the rod (that is, it may be rotationally mounted). The front portion of the rod 208, near the front bracket 206a, extends into the fixed handle of the handle assembly (that is, handle 202a) and is attached to the front bracket 206a. The front handle can include any material that helps with gripping, lifting, moving, and/or operating the jack 200. In some embodiments, the material used on the fixed handle 202a of the handle assembly may be rubber or any other durable material that provides comfort and is resistant to the working environment.

Behind the fixed handle, the second handle (that is, handle 202b) is slidably attached to the rod 208. That is, the rear end of the rod is attached to or mounted to the rear bracket 206b, but the rear handle 202b is not. The rear end of the rod may be secured to the bracket with a nut or rivet or other suitable fastener. This may be a removable fastener. The second handle may include a metal tube on its interior surrounding the handle assembly rod and a second grip of suitable material installed onto the metal tube (the material may be the same as the material on the front handle 202a). A metal plate 210 may be located at the front portion of the handle 202b that is configured to fixably attach a second metal plate 212 of chuck assembly 204. This serves to attach the chuck assembly to the slidable handle portion. The metal plates 210 and 212 may be secured with suitable hardware such as screws, bolts, rivets, etc. The metal plates may be removably secured to allow for removal and/or replacement of the chuck assembly. The chuck assembly 204 includes two metal members or a single bracket 214 extending downward from the metal rod 208 to the primary chuck 216 (or two-piece chuck) that engages with a tensioning tendon. As can be seen in the Figures, such as FIG. 9, the primary chuck 216 may have two pieces. The primary chuck 216 may have rough and/or grooved and/or threaded internal surface as can be seen to facilitate frictional gripping when in contact with a tendon.

Figures 6A, 6B:
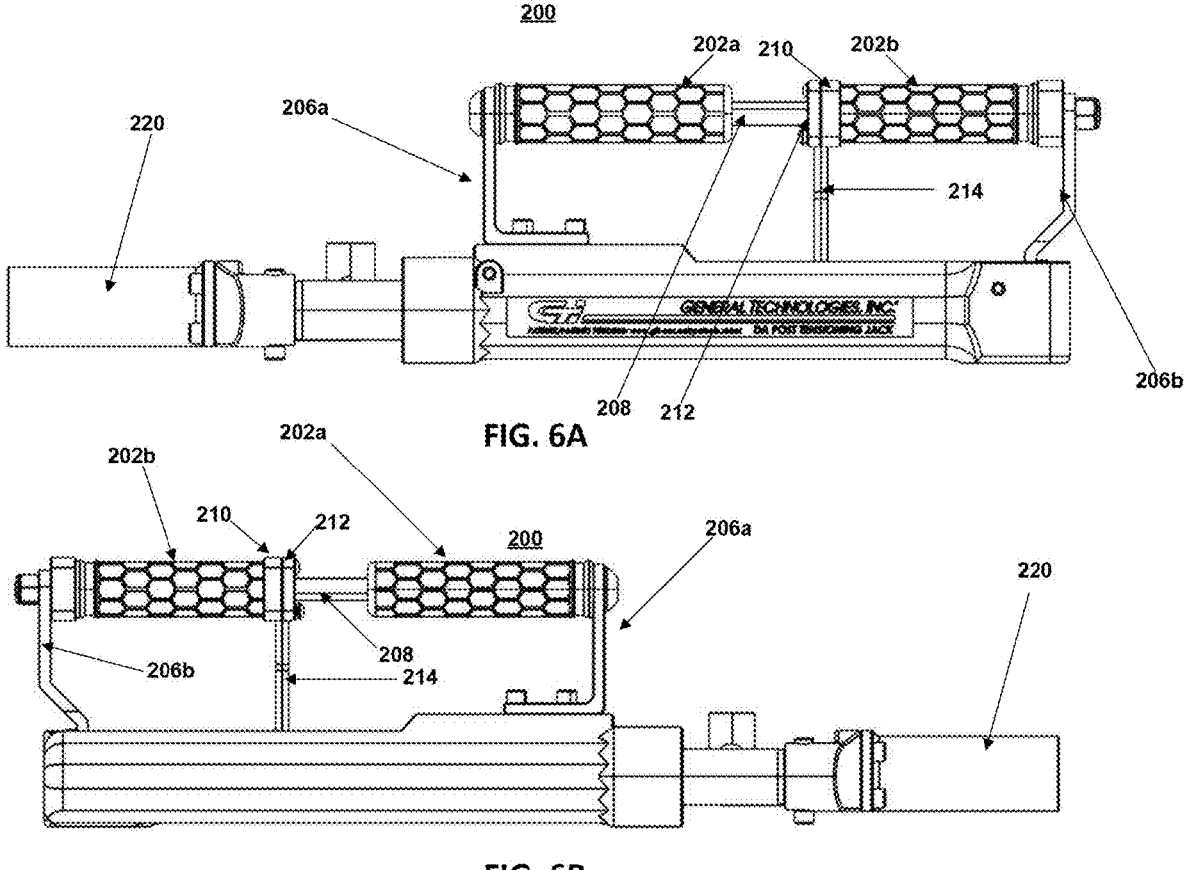
FIGS. 6A and 6B depict a side view of a second lightweight post-tensioning jack according to exemplary embodiments.
Figure 7:
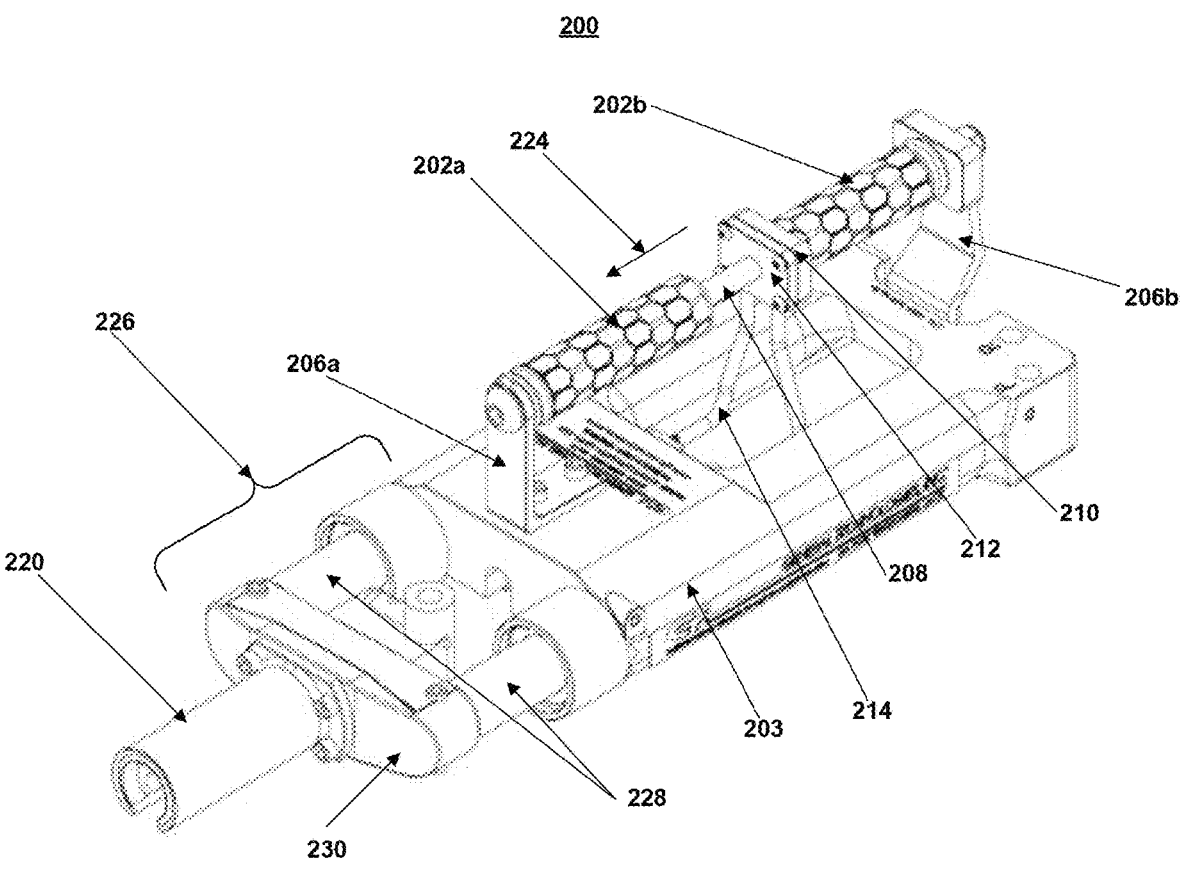
FIG. 7 depicts a top perspective view of the second lightweight post-tensioning jack according to exemplary embodiments.

The slidable handle 202b is designed to be smaller than the length of the rod 208 behind the fixed grip, thereby permitting sliding in an axial direction 224 along the axis of the handle rod. Sliding the slidable handle axially changes the axial position of the chuck relative to the jack frame 203. When the jack is placed onto a tendon, the slidable handle may be in a position distal from the fixed handle (such as shown in FIGS. 6A and 6B, for example). Then the slidable handle may be moved axially towards the fixed handle in the direction 224. This movement may cause the primary chuck to engage the tendon and provide friction so that the jack is grabbing the tendon. The amount of friction may be dictated by the design of the chuck (i.e., engagement pad materials, wedge geometry, etc.), as well as how hard the slidable handle is forced in the axial direction toward the fixed handle. Exemplary embodiments may be configured so that the resulting friction between the chuck and tendon is sufficient to avoid slipping when the jack is operated to pull the tendon. As can be seen in FIG. 8, for example, the inside of the primary chuck 216 may be threaded or otherwise have a rough surface to facilitate gripping onto the tendon. The frame 203 may be moveably or slidably attached to the pressure cylinder 220 and its mounting assembly 230 by two pistons 228. These pistons allow the frame 203 to move rearward from the pressure cylinder 120 during tensioning operations on a tendon as the tendon is gripped by the primary chuck.

Figure 10:
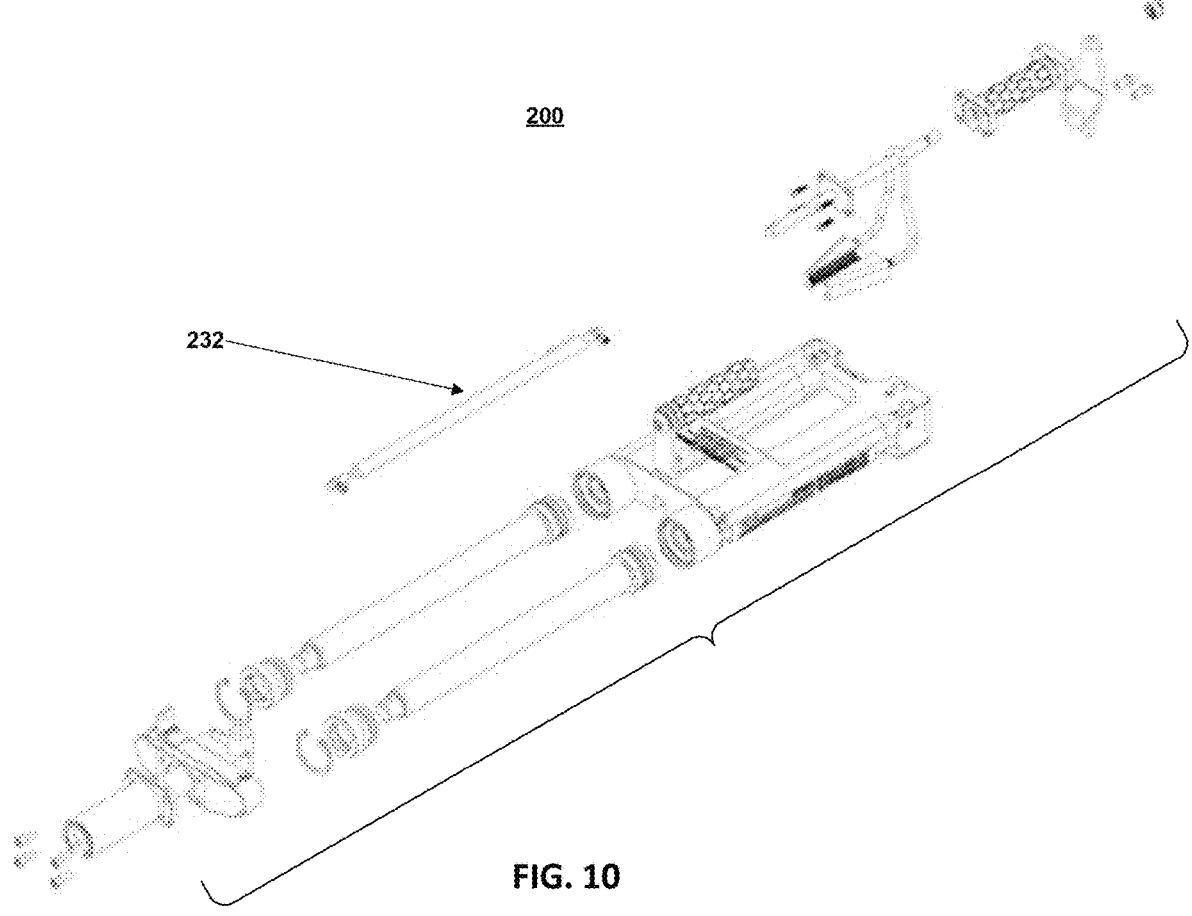
FIG. 10 depicts a second exploded view of the second lightweight post-tensioning jack according to exemplary embodiments.

FIG. 10 depicts an exploded view of the jack 200 with a sensor 232 added. The sensor 232 may be configured to measure the linear movement of the pistons 228. The sensor 232 may be configured with different sensors to measure this movement. For example, a linear potentiometer may be used. This is shown in the Figure. Other exemplary, non-limiting, sensors may include linear magnetic Hall sensor, magnetostrictive linear position sensors, Linear Variable Differential Transformer (LVDT) sensors, Linear Variable Inductance Transducer (LVIT) sensors, Hall effect technology sensors, or optical probes with optoelectronic sensor technology. The sensor 232 may be fitted to the lightweight jack 100 also in a similar manner.

Referring to FIGS. 11 through 14, a pump unit 300 according to exemplary embodiments is shown. The pump unit 300 is a hydraulic pump unit. The pump unit 300 may be used with the jacks according to exemplary embodiments, such lightweight jack 100 and jack 200 described above. The pump has an electric motor 302 to provide power. The motor may be a brushless motor. The motor is battery powered (for example, a battery pack having two batteries 304a and 304b is depicted). In some embodiments the pump unit may receive power from an external source (i.e., a connection to an electric power source). In various embodiments, the pump unit may be capable of using different power sources such as a battery and external power, as shown, to provide added flexibility. The batteries 304*a* and 304*b* may be removable and may be rechargeable. Located between the batteries may be an electronics assembly 306

The pump unit 300 has a hydraulic valve block 308 with a solenoid 310 for actuation. The hydraulic valve block 308 includes a valve assembly and a sensor assembly. The sensor assembly may include a temperate and pressure sensor. The ports include releasable connections to allow for ease of attachment/detachment of external hoses. The external hoses may then be connected to a hydraulic device, such as a jack 100 or 200. The port connections on the solenoid may be standard hydraulic connections. It should be appreciated that the port connections depicted are exemplary and other port configurations are possible. Further, the various components of the pump unit may be detachable to allow for disassembly to facilitate repair and maintenance activities. The pump unit 300 may have a flow meter assembly 312. The ports of the solenoid 310 are exemplary and can be in any configuration suitable to support the operation of the pump unit 300.

The pump portion of the hydraulic pump unit 300 is located internally. The pump unit 300 also has a fan, cooling coil and/or other heat exchanger structure to provide to cooling (heat exchange) of the hydraulic fluid when the pump unit is in operation. The lower section 316 contains a pump (not shown). The pump is contained within the internal volume of the lower section 316. The pump may be any suitable pump for the application (i.e., hydraulic power). For example, the pump may be a piston pump. Other types of pumps (e.g., gear, vane) may be used. The lower section 316 may be a single cast pan. The internal volume of the lower section 316 serves as a hydraulic fluid reservoir.

Figure 11:
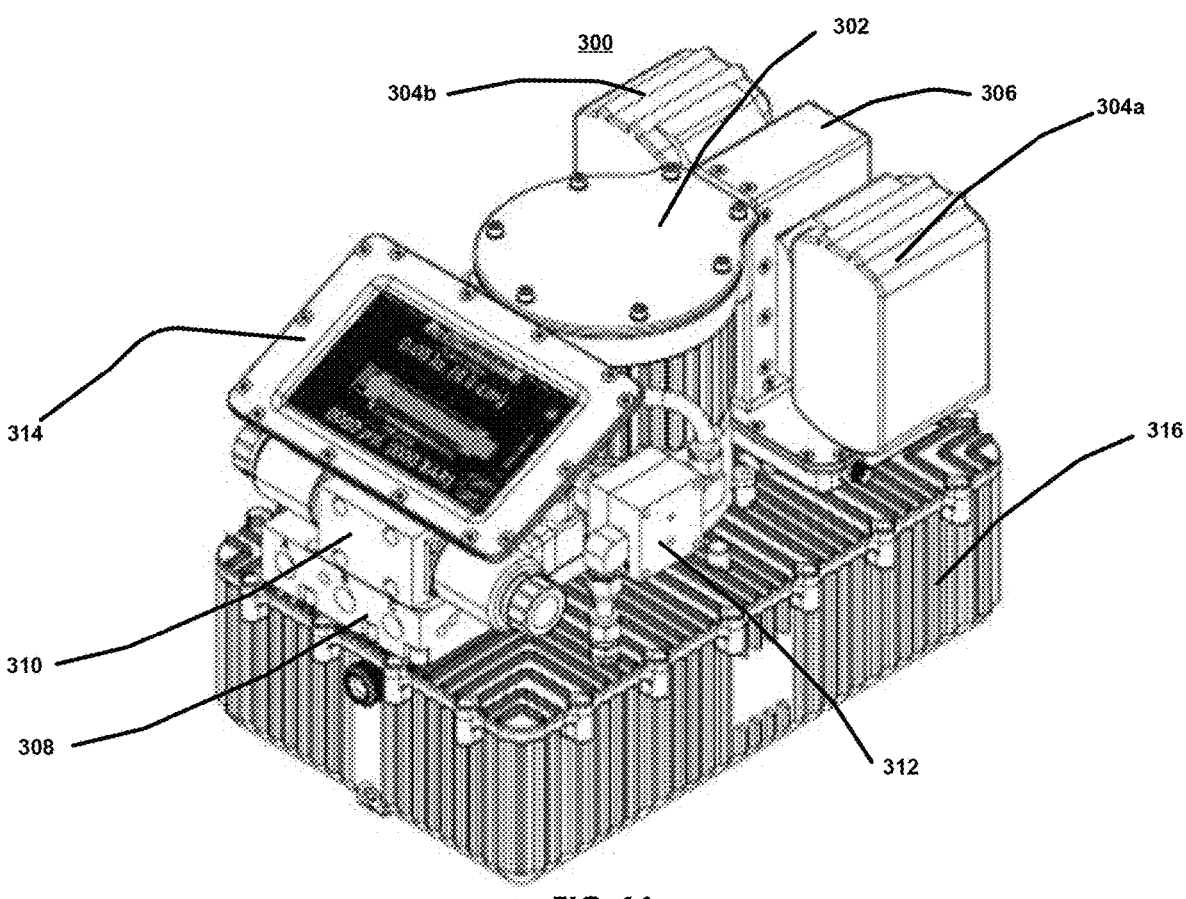
FIG. 11 depicts a front perspective view of a hydraulic pump unit according to exemplary embodiments.
Figure 12:
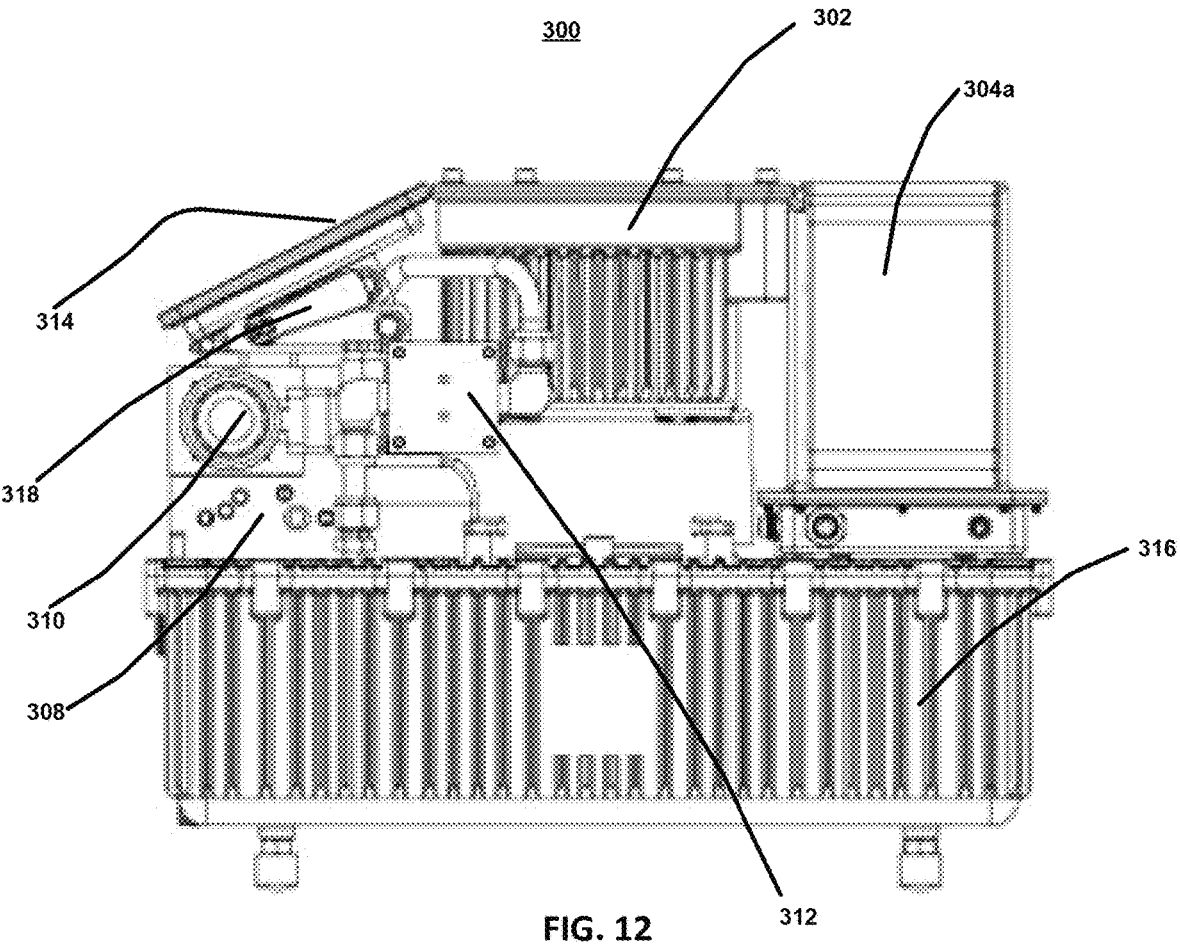
FIG. 12 depicts a side view of the hydraulic pump unit according to exemplary embodiments.
Figure 13:
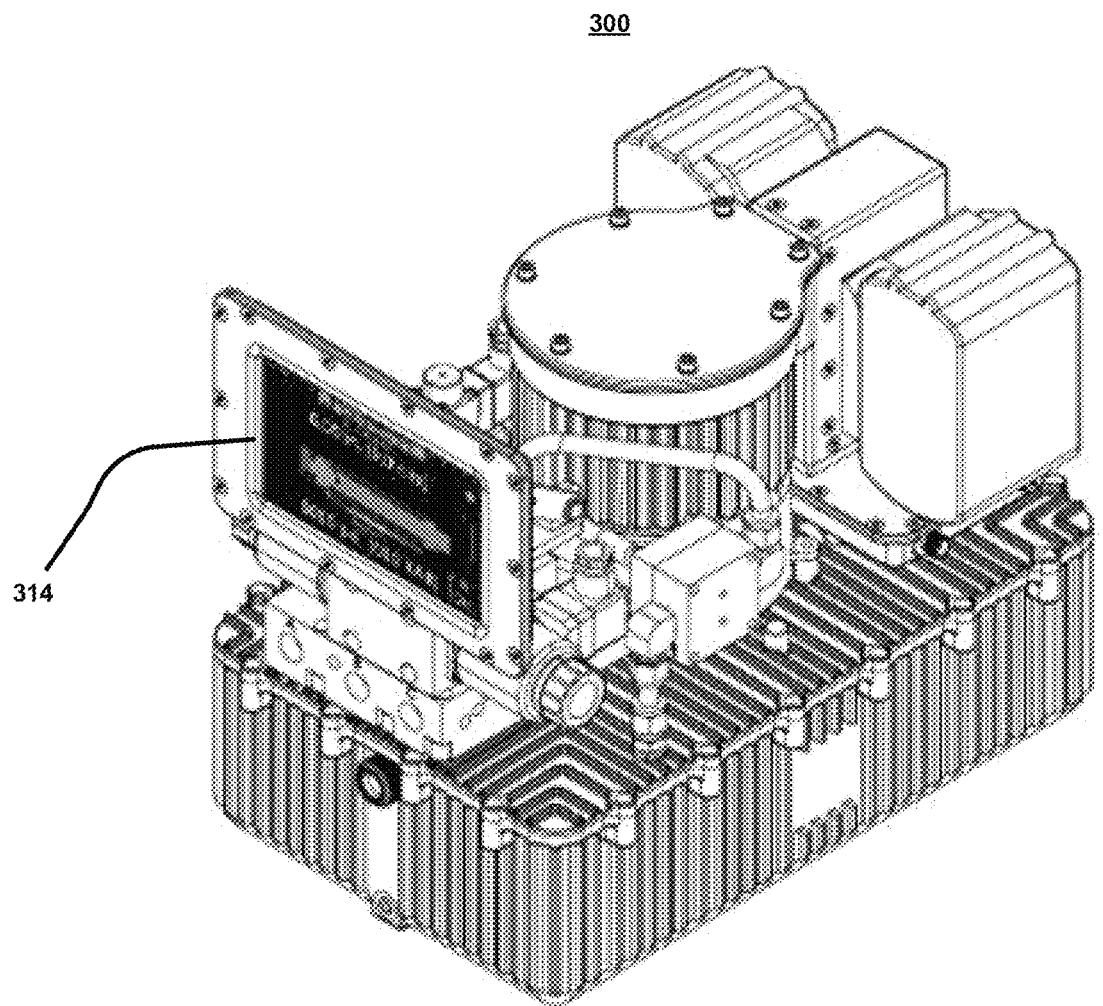
FIG. 13 depicts a second front perspective view of the hydraulic pump unit according to exemplary embodiments.
Figure 14:
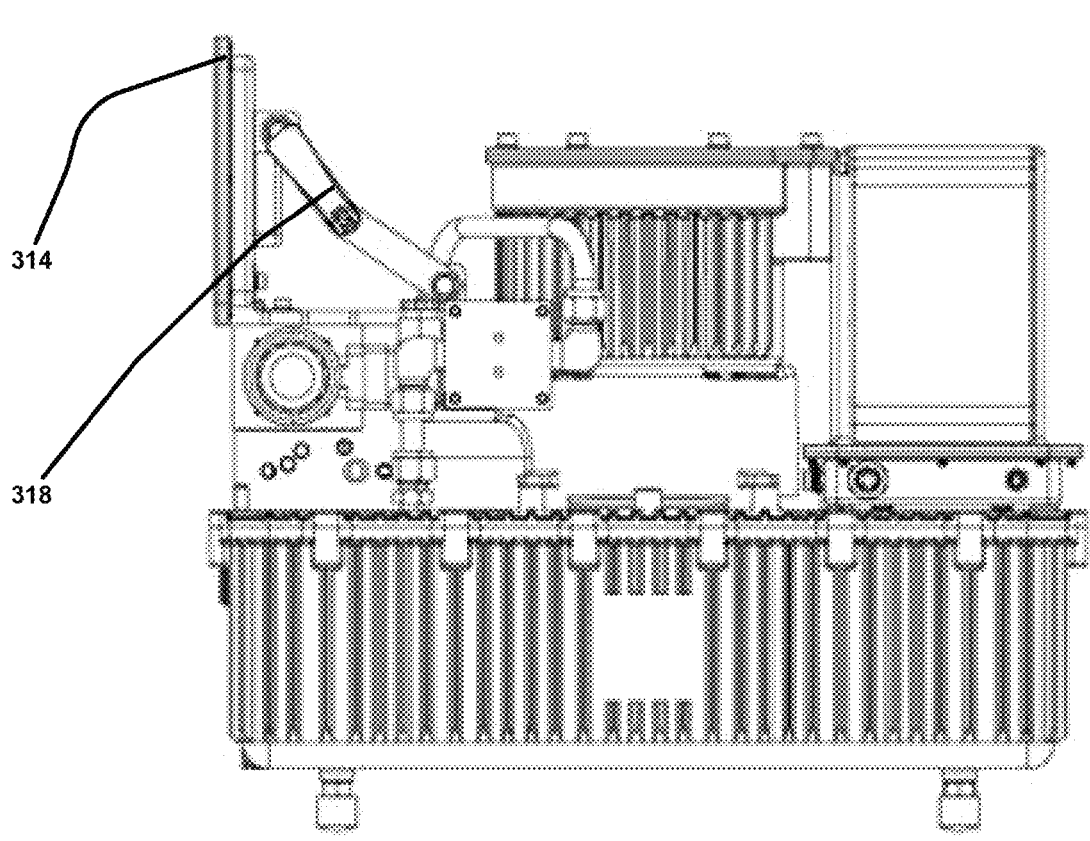
FIG. 14 depicts a second side view of the hydraulic pump unit according to exemplary embodiments.

In exemplary embodiments, the pump has a display 314 that is touch capable to provide for operational input, as well as display of pump status and system operating parameters (e.g., temperature, pressure, flow, battery status, etc.). The display 314 can display the sensor output from the pump (such as from sensor 232). The display may be digital and may be of any suitable screen type such as LED. Memory storage may be provided to allow for data on usage and operations to be stored and later retrieved. The pump unit 300 may have one or more processers to perform calculations and other functions in support of operation of the pump unit 300. In various embodiments, the pump unit 300 may have a wireless connection (e.g., WIFI and/or Bluetooth) to enable remote control and/or monitoring of the pump operation from a computing device such as, but not limited to, an external electronic device, a laptop, a tablet, and/or smartphone. In various embodiments, the display 314 is movable between different positions to allow for lowering the display for transport as well as positioning to allow for a certain viewing angle when in use. For example, FIGS. 11 and 12 depict the display 314 in a lowered position and FIGS. 13 and 14 depict the display 314 in a raised position. An arm assembly 318 is attached to the display 314 to provide support. As can be seen in FIGS. 12 and 14, the arm assembly 318 may be articulated with at least one joint to facilitate movement of the display 314.

Processes and Systems for Monitoring Stress

The aforementioned frameless lightweight hydraulic jack, dual-action jack, a twin cylinder jack, a single cylinder jack, or any other hydraulic stressing jack may be employed in processes for monitoring stress applied to a tendon by a hydraulic jack during tensioning of concrete.

In exemplary embodiments, the pump unit has one or more sensors. For example, the pump unit can have pressure sensor(s), temperature sensor(s), and/or flow sensor(s)/meter(s). The jack has one or more sensors. For example, the jack may have a cylinder position sensor(s) and/or flow sensor(s)/meter(s). The sensor(s) on the jack may communicate with the pump unit. For example, the position of the cylinders may be output to the pump unit. The cylinder position information is used in conjunction with pressure sensor and flow meter sensors on the pump to calculate elongation. This information is shown on the display of the pump and the wireless remote display for the pump. According to exemplary embodiments, the sensor(s) may communicate with the pump unit wirelessly. For example, Bluetooth or WiFi may be used. In some embodiments, the communication may be via a hard wired connection.

The pump may have one or more processors along with suitable memory to perform the processing and calculations described herein. The output (i.e., sensor data and calculations) may also be measured, recorded (e.g., a USB or other device), and/or transmitted via Wifi, Bluetooth, cellular, or other recording or transmission devices to external devices, such as, for example, a portable electronic device, laptop, cell phone, tablet, and/or computer.

In various embodiments, the processes may include measuring an amount of hydraulic fluid that flows through the hydraulic jack during tensioning. This may be in addition to or in place of measuring the cylinder position described above. The amount of measured hydraulic fluid may be a weight, a volume, or both of the hydraulic fluid that flows through the hydraulic jack during tensioning. The measurement may be conducted in any convenient manner which manner may vary depending upon the jack, the application, and/or desired results. That is, an appropriate sensor configuration may be used to conduct such measurements. The measurements may be taken at the at the pump unit (i.e., at the valve block). If desired, gauges may be employed. For example, a digital or analog gauge for measuring the amount of hydraulic fluid that flows through the pump and/or jack may be used during tensioning. A gauge may be located on the pump unit and/or jack. In this manner additional data may be used to obtain, for example, more accurate correlations and/or correction factors.

FIG. 15*a* shows a method 500 that has steps 502, 504, 506 and 508 that show this process as described below.

In various embodiments, one or more sensors may be on the jack to measure the amount of hydraulic fluid. These can be in addition to the measurements at the pump in various embodiments, The specific type of sensor varies depending upon whether volume, weight, velocity, and/or other factors of the hydraulic fluid are being sensed and/or recorded and/or transmitted. The sensor type may include a volumetric sensor, a weight sensor, and/or a velocity sensor.

The measurement may be conducted by any convenient device and then the measurement may be correlated with an amount of stress applied per unit of hydraulic fluid to determine a total amount of stress employed on the tendon. The correlating may comprises determining a mathematical relationship between known amounts of hydraulic fluid with known amounts of stress applied per unit of hydraulic fluid for the jack. This may be done in any convenient manner such as, for example, assessing the linear or other mathematical association between the stressing and amount of hydraulic fluid, volume or weight and applying said mathematical relationship to the measured amount of hydraulic fluid. In many cases the mathematical relationship between the measured amount of hydraulic fluid and the amount of stress applied per unit of hydraulic fluid may be a linear relationship.

If desired or appropriate a correction coefficient for various factors involved in the stressing and/or measuring may be determined and applied so that a more accurate correlation may be determined. The specific type, amount, and nature of the hydraulic fluid is not particularly important so long as a substantially accurate correlation is determined. In some embodiments the hydraulic fluid is substantially incompressible. If desired or necessary for a more accurate correlation, the physical properties of the hydraulic fluid, the chemical properties of the hydraulic fluid, environmental factors, or any combination thereof may be taken into account in determining the mathematical relationship.

The methods and/or systems may be configured such that the flow of hydraulic fluid through the jack may be slowed and/or stopped upon reaching pre-determined thresholds such as (1) a pre-determined measured amount of hydraulic fluid, (2) a pre-determined total amount of stress employed on the tendon, or both (1) and (2). In this manner, the amount of stress desired may be more accurately achieved than with, for example, measuring tendon elongation. In order to more accurately measure, record, and/or achieve desired amounts of stress on a tendon one may process, transfer, and/or save relevant data. Such data may include, for example, data related to the correlating and/or stopping of the hydraulic fluid.

If desired, devices such as a limiter may be employed which are configured to, for example, release hydraulic fluid once the amount of measured hydraulic fluid reaches (1) a pre-determined measured amount of hydraulic fluid, (2) a pre-determined amount of time after the amount of measured hydraulic fluid reaches a pre-determined measured amount of hydraulic fluid, and/or 3 (3) both (1) and (2).

FIG. 15b shows a method 510 having steps 510, 512, 514, and 516 that show the process of measuring distance traveled of the cylinder.

In various embodiments, processes may include measuring distance traveled by the pistons (cylinders) of the jack during operation. The data from the sensors on the jack that measure the piston travel may be transmitted from the jack to an external receiver, such as a hydraulic pump unit as described herein. This information can be then used to calculate the tension applied to the tendon and/or how far the tendon is pulled (elongation). The stress applied to the tendon can then be calculated as should be appreciated by one of ordinary skill in the art. Output from the sensors on the jack and the pump may be used in the calculation. The actual elongation can be then compared to the theoretical elongation. Method 510 may be conducted in parallel with method 500.

An elongation of the tendon after applied stress, such as by measuring the cylinder position as described above, may also be measured, recorded (e.g., a USB or other device), and/or transmitted via WiFi, Bluetooth, cellular, or other recording or transmission devices. That is, the output from the sensor(s) on the jack may be transmitted to the pump. The pump may receive the output and use it to perform the various calculations as described above. The pump may have one or more processors, along with memory, to perform the calculations for this method, as well as the method of FIG. 15a as described above. The output from all sensors may be transmitted in real-time and the calculations may be performed in real-time. The pump may have a display as described above to display the sensor information as well as the resulting calculation outputs.

Similarly, the systems and methods may track a number of times stress is applied by a jack during tensioning of concrete. In this manner one may monitor the lifetime of the jack and/or servicing needs.

As described above, the methods and systems are not particularly limited and apply to, for example, hydraulic jacks like a frameless lightweight hydraulic jack, a twin cylinder jack, or a single cylinder jack and/or tendons like monostrand or multistrand.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Further, it is to be understood that the terminology used herein is for the purpose of describing particular embodiments only and is not intended to be limiting. The terms "a" or "an" as used herein, are defined as one or more than one.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

What is claimed is:

1. A process for monitoring stress applied to a tendon by a hydraulic jack during tensioning of concrete, comprising:
   measuring, using at least one sensor, a distance of travel of a piston on a hydraulic jack during tensioning of concrete wherein the at least one sensor is mounted on the hydraulic jack proximate the piston and configured to measure a linear movement of the piston;
   transmitting, wirelessly, the output of the at least one sensor to a pump unit that is located external to the hydraulic jack;
   calculating, by one or more processors located on the pump unit, a total amount of stress employed on the tendon from the measured distance; and
   displaying, at the hydraulic pump unit, the total amount of stress;
   wherein the at least one sensor comprises a linear potentiometer, a linear magnetic Hall sensor, a magnetostrictive linear position sensor, a Linear Variable Differential Transformer (LVDT) sensor, a Linear Variable Inductance Transducer (LVIT) sensor, a Hall effect technology sensor, or an optical probe with optoelectronic sensor technology.

2. The process of claim 1, that further comprises measuring and displaying one or more operating parameters of the hydraulic pump, the one or more operating parameters comprising temperature and flow of hydraulic fluid.

3. The process of claim 1, wherein the hydraulic jack comprises a frameless lightweight hydraulic jack, a twin cylinder jack, or a single cylinder jack.

4. The process of claim 1, wherein the tendon is monostrand or multistrand.

5. The process of claim 1, further comprising: transmitting, wirelessly, the total amount of stress and the operating parameters to an external device that is separate and apart from the hydraulic jack and the pump unit.

\* \* \* \* \*